(12) United States Patent
Huang et al.

(10) Patent No.: US 7,452,445 B2
(45) Date of Patent: *Nov. 18, 2008

(54) NON-WOODY FIBER MULCHING MAT AND PRODUCTION METHOD THEREOF

(75) Inventors: Jenn-Wen Huang, Taiping (TW); Yu-Hsiang Peng, Taipei (TW)

(73) Assignee: Yeun Foong Yu Paper MFG Co. Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/293,780

(22) Filed: Dec. 2, 2005

(65) Prior Publication Data

US 2006/0070295 A1 Apr. 6, 2006

Related U.S. Application Data

(62) Division of application No. 10/785,884, filed on Feb. 23, 2004, now abandoned.

(30) Foreign Application Priority Data

Feb. 26, 2003 (TW) ............... 92104113 A

(51) Int. Cl.
*D21C 3/20* (2006.01)
*D21H 11/12* (2006.01)
*D21H 17/20* (2006.01)
*D21H 17/28* (2006.01)
*D21H 17/30* (2006.01)

(52) U.S. Cl. .............. 162/72; 162/99; 162/164.1; 162/175; 162/181.4; 47/9; 47/56; 435/278

(58) Field of Classification Search .......... 162/109, 162/117, 123, 125, 127, 129, 146–147, 141, 162/157.1, 158, 164.1, 101, 164.3, 164.6, 162/178, 168.1, 189, 168.3, 175, 181.1, 181.2, 162/181.4, 72, 97, 148, 91, 99; 47/32.7–32.8, 47/65.5, 65.9, 74, 77, 81, 57.6, 56, 9, 56.9; 435/277–278

See application file for complete search history.

(56) References Cited

U.S. PATENT DOCUMENTS 1,639,152 A 8/1927 Sweeney (Continued)

FOREIGN PATENT DOCUMENTS

CN 1395002 A 2/2003

(Continued)

*Primary Examiner*—José A Fortuna
(74) *Attorney, Agent, or Firm*—Volpe and Koenig, P.C.

(57) ABSTRACT

A liquid fiber mulching mat of a non-woody fiber and the production method thereof are disclosed. The production method of a liquid fiber mulching mat for a non-woody fiber includes steps of providing a biopulp of a non-woody fiber plant, a polymer and water, mixing the biopulp, the polymer and water well for preparing a fiber pulp of the non-woody fiber plant, and applying the fiber pulp of the non-woody fiber plant on a surface of an article for forming the liquid fiber mulching mat. Besides, a solid fiber mulching mat of a non-woody fiber is disclosed. The fiber mulching mat can be used in farms for protecting the weeds and used in mountainside land for preventing soil collapse. Also the fiber mulching mat can be used in arid area for decreasing water evaporation and preventing desertification and dust storm.

4 Claims, 2 Drawing Sheets

U.S. PATENT DOCUMENTS

| | | | |
|---|---|---|---|
| 1,931,248 A | | 10/1933 | Bryant |
| 2,826,865 A | | 3/1958 | Chohamin |
| 2,971,292 A | | 2/1961 | Malecki |
| 3,303,609 A | | 2/1967 | MacHenry |
| 3,805,447 A | | 4/1974 | Rion |
| 4,067,140 A | * | 1/1978 | Thomas .......................... 47/9 |
| 4,071,400 A | | 1/1978 | Jankowiak |
| 4,297,810 A | * | 11/1981 | Hansford ........................ 47/9 |
| 4,720,935 A | | 1/1988 | Rogers et al. |
| 5,005,345 A | * | 4/1991 | Pinckard et al. ................ 56/71 |
| 5,055,159 A | | 10/1991 | Blanchette et al. |
| 5,251,398 A | | 10/1993 | Balassa |
| 5,427,945 A | | 6/1995 | Blanchette et al. |
| 5,470,434 A | | 11/1995 | Terasawa et al. |
| 5,554,535 A | | 9/1996 | Blanchette et al. |
| 5,620,564 A | | 4/1997 | Akhtar |
| 5,705,383 A | | 1/1998 | Blanchette et al. |
| 5,750,005 A | | 5/1998 | Akhtar |
| 5,806,445 A | | 9/1998 | Decker |
| 5,884,570 A | * | 3/1999 | Lincoln ..................... 111/130 |
| 6,021,598 A | | 2/2000 | Holton |
| 6,123,036 A | | 9/2000 | Decker |
| 6,158,167 A | | 12/2000 | Spittle |
| 6,286,253 B1 | * | 9/2001 | Decker .......................... 47/56 |
| 6,387,690 B1 | | 5/2002 | Schulein et al. |
| 6,402,887 B1 | | 6/2002 | Akhtar et al. |
| 6,446,386 B1 | | 9/2002 | Holloway |
| 6,490,827 B2 | | 12/2002 | Hasegawa et al. |
| 6,613,192 B1 | | 9/2003 | Bajpai et al. |
| 6,745,513 B2 | | 6/2004 | Krysiak et al. |
| 6,811,653 B2 | | 11/2004 | Huang |
| 6,855,182 B2 | | 2/2005 | Sears |
| 7,008,505 B2 | * | 3/2006 | Akhtar et al. ................. 162/72 |
| 7,294,228 B2 | * | 11/2007 | Huang et al. .................. 162/72 |
| 2002/0096273 A1 | | 7/2002 | Farrell |
| 2002/0096285 A1 | | 7/2002 | Furunaga et al. |
| 2003/0079846 A1 | | 5/2003 | Huang |
| 2004/0011102 A1 | | 1/2004 | Sears |
| 2004/0016527 A1 | | 1/2004 | Huang |
| 2004/0060677 A1 | | 4/2004 | Huang |
| 2004/0154762 A1 | | 8/2004 | Akhtar et al. |
| 2004/0163780 A1 | | 8/2004 | Huang et al. |
| 2004/0172997 A1 | | 9/2004 | Huang et al. |
| 2004/0194370 A1 | | 10/2004 | Huang et al. |
| 2004/0202851 A1 | | 10/2004 | Goodrum et al. |
| 2004/0238134 A1 | * | 12/2004 | Akhtar et al. ................. 162/20 |
| 2005/0246949 A1 | | 11/2005 | Girard et al. |
| 2006/0060316 A1 | * | 3/2006 | Huang et al. .................. 162/72 |
| 2006/0070295 A1 | * | 4/2006 | Huang et al. ..................... 47/9 |
| 2006/0117653 A1 | | 6/2006 | Werth |
| 2007/0102128 A1 | | 5/2007 | Levit et al. |
| 2007/0119559 A1 | | 5/2007 | Lund et al. |

FOREIGN PATENT DOCUMENTS

| | | |
|---|---|---|
| EP | 0 200 409 A2 | 11/1986 |
| EP | 1 088 937 | 4/2001 |
| EP | 1462565 A1 | 9/2004 |
| EP | 1469122 | 10/2004 |
| EP | 1469122 A2 * | 10/2004 |
| EP | 1471181 A2 * | 10/2004 |
| JP | 07 53602 | 2/1995 |
| JP | 07 238488 | 9/1995 |
| JP | 08 92893 | 4/1996 |
| JP | 10 77595 | 3/1998 |
| JP | 11 61678 | 3/1999 |
| JP | 2001 226898 | 8/2001 |
| KR | 2003 0065916 | 8/2003 |
| WO | 89 01074 | 2/1989 |

* cited by examiner

NON-WOODY FIBER MULCHING MAT AND PRODUCTION METHOD THEREOF

CROSS REFERENCE TO RELATED APPLICATION

This application is a division of U.S. patent application Ser. No. 10/785,884, filed Feb. 23, 2004, which is incorporated by reference as if fully set forth.

FIELD OF THE INVENTION

The present invention provides a biopulp and a biopulping method thereof, and more particularly to a biopulp for non-woody fiber plants and a biopulping method thereof.

BACKGROUND OF THE INVENTION

Generally, the agricultural production includes the steps of land-preparation, sowing, fertilization, hand weeding and harvesting. Each step requires a huge amount of manpower. Particularly, the step of hand weeding requires a huge amount of manpower, which always delays the organic farming for a period of time. In order to proceed the step of weed removal, the farmers conventionally cover the land with a black plastic film for preventing the weeds from growing. Although the plastic film is cheap and convenient, it is non-biodegradable. After the crops are harvested, the farmers don't know how to deal with the useless black plastic film. Besides, because the black plastic film can't be decomposed naturally, it thus results in environmental pollution once the black plastic film is discarded. However, in order to protect our environment, the usage of plastic should be limited. Thus, it is important to provide a biodegradable material for agricultural production. Therefore, a new method for satisfying the requirement of weed removal and preventing the problem of environmental pollution draws a large number of researchers' attention.

Furthermore, there are other problems in the natural environment. For example, water and soil conservation on the mountainside land is not easy to carry out. Many countries have paid close attention to mobilizing the initiation of the people to control the soil erosion. Also, the problems of desertification and dust storms are serious because water is greatly evapotranspirated in arid area. These problems become more and more serious and are in an urgent need to be solved.

Owing to the naturally decomposed feature of paper products, after the agricultural purpose is achieved, the paper products will be automatically returned to nature and become organic materials in soil, thereby eliminating the drawbacks of recycling the discard or causing environmental pollution. Hence, to research and develop paper products to replace these plastic weed-proof materials are a foresighted object in the considerations of economical effect and environmental protection.

The papermaking material typically comes from the natural organic wood fibers, which are also excellent carriers for microorganisms. Therefore, if the functional components can be added and adjusted in the papermaking material during the manufacturing process of making the paper product, it can be sufficiently applied in agriculture and natural environments for solving the problems described above. However, the waste liquid is discharged from factories in the traditional chemical paper-making process, which also results in environmental pollution. Nowadays, people in the whole world pay full attention to environmental protection. Managers in the paper-making industry are obligated to spend money for improving the environmental quality. The production costs are therefore raised. Those problems really strike against the paper-making industry.

Accordingly, it is known that how to develop a method for providing paper material with multiple functions has become a major problem waiting to be solved. Thus, the invention has the utility for the agricultural industry.

SUMMARY

It is therefore an object of the present invention to provide a fiber mulching mat and the production method thereof for being applied in agricultural planting and cultivating to solve the problems resulting from weed control, paper-making processes, manpower costs, water and soil loss on the mountainside land, desertification and dust storm, thereby the agricultural producing is possibly becoming a permanent industry.

It is an object of the present invention to provide a liquid fiber mulching mat of a non-woody fiber and the production method thereof. The present invention utilizes a non-woody fiber plant which is decomposed by a microorganism and cooked with a cooking liquid of 1% (w/v) CaO for preparing a fiber pulp, to produce a liquid and a solid fiber mulching mat. The present invention not only is contributive to the recycling of a non-woody fiber plant but also has the advantage of not causing any environmental pollution thereby the agricultural producing is possibly becoming a permanent industry.

In accordance with an aspect of the present invention, a production method of a liquid fiber mulching mat for a non-woody fiber is provided. The method includes steps of providing a biopulp of a non-woody fiber plant, a polymer and a water, mixing the biopulp, the polymer and the water well for preparing a fiber pulp of the non-woody fiber plant, and applying the fiber pulp of the non-woody fiber plant on a surface of an article for forming the liquid fiber mulching mat.

Preferably, the biopulp is provided by steps of providing a culture solution with a non-woody fiber plant therein, adding a suspension of a microorganism into the culture solution, fermentatively culturing the culture solution for preparing a pulp solution, boiling the pulp solution, pulping the pulp solution, and screening the pulp solution for isolating the biopulp from the pulp solution.

Preferably, the polymer is added into the biopulp at a concentration of 2500 ppm.

Preferably, the polymer is one selected from a group consisting of an alginic acid, an alginic salt, a polyelectrolyte, a corn wheat bran and a starch.

Preferably, the corn wheat bran has a concentration ranged from 0.5 to 1.0% (w/v).

Preferably, water is added into the biopulp by a volume of 2~10 times of the biopulp.

Preferably, the production method further includes a step of adding a seed for grass vegetation into the liquid fiber pulp.

Preferably, the seed for grass vegetation is one selected from a group consisting of a *Paspalum notatum* Flugge seed, a *Digitaria decumbens* Stent seed, a *Brachiaria mutica* (Forsk.) Stapf seed, a *Cynodon dactylon* seed and a *Stenotaphrum secvndatum* (walt) kvntze.

Preferably, the article is a soil.

In accordance with another aspect of the present invention, a production method of a liquid fiber mulching mat is provided. The method includes steps of providing a biopulp of a fiber plant, a polymer and a water, mixing the biopulp, the polymer and the water well for preparing a liquid fiber pulp of the fiber plant and applying the fiber pulp of the fiber plant on a surface of an article for forming the liquid fiber mulching mat.

Preferably, the fiber plant is a non-woody fiber plant.

Preferably, the polymer is added into the biopulp at a concentration of 2500 ppm Preferably, the polymer is one selected from a group consisting of an alginic acid, an alginic salt, a polyelectrolyte, a corn wheat bran and a starch.

Preferably, the corn wheat bran has a concentration ranged from 0.5 to 1.0% (w/v).

Preferably, the water is added into the biopulp by a volume of 2 to 10 times of the biopulp.

Preferably, the production method further includes a step of adding a seed for grass vegetation into the liquid fiber pulp.

Preferably, the seed for grass vegetation is one selected from a group consisting of a *Paspalum notatum* Flugge seed, a *Digitaria decumbens* Stent seed, a *Brachiaria mutica* (Forsk.) Stapf seed, a *Cynodon dactylon* seed and a *Stenotaphrum secvndatum* (wait) kvntze.

In accordance with another aspect of the present invention, a liquid fiber mulching mat of a non-woody fiber is provided. The liquid fiber mulching mat includes a liquid fiber pulp, including a biopulp of a non-woody fiber plant, a polymer and a water, wherein the fiber pulp is well mixed to be applied on a surface of an article so as to form the liquid fiber mulching mat.

Preferably, the polymer is one selected from a group consisting of an alginic acid, an alginic salt, a polyelectrolyte, a corn wheat bran and a starch.

Preferably, the liquid fiber pulp further includes a seed for grass vegetation.

In accordance with another aspect of the present invention, a production method of a solid fiber mulching mat for a non-woody fiber. The method includes steps of providing a biopulp of a non-woody fiber plant, a polymer and a water, mixing the biopulp, the polymer and water well for preparing a fiber pulp of the non-woody fiber plant, spreading the fiber pulp of the non-woody fiber plant, squeezing and dehydrating the fiber pulp, and drying the fiber pulp so as to form the solid fiber mulching mat.

Preferably, the polymer is added into the biopulp at a concentration of 2500 ppm.

Preferably, the polymer is one selected from a group consisting of an alginic acid, an alginic salt, a polyelectrolyte, a corn bran and a starch.

Preferably, the corn wheat bran has a concentration ranged from 0.5 to 1.0% (w/v).

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENTS

Figure 1:
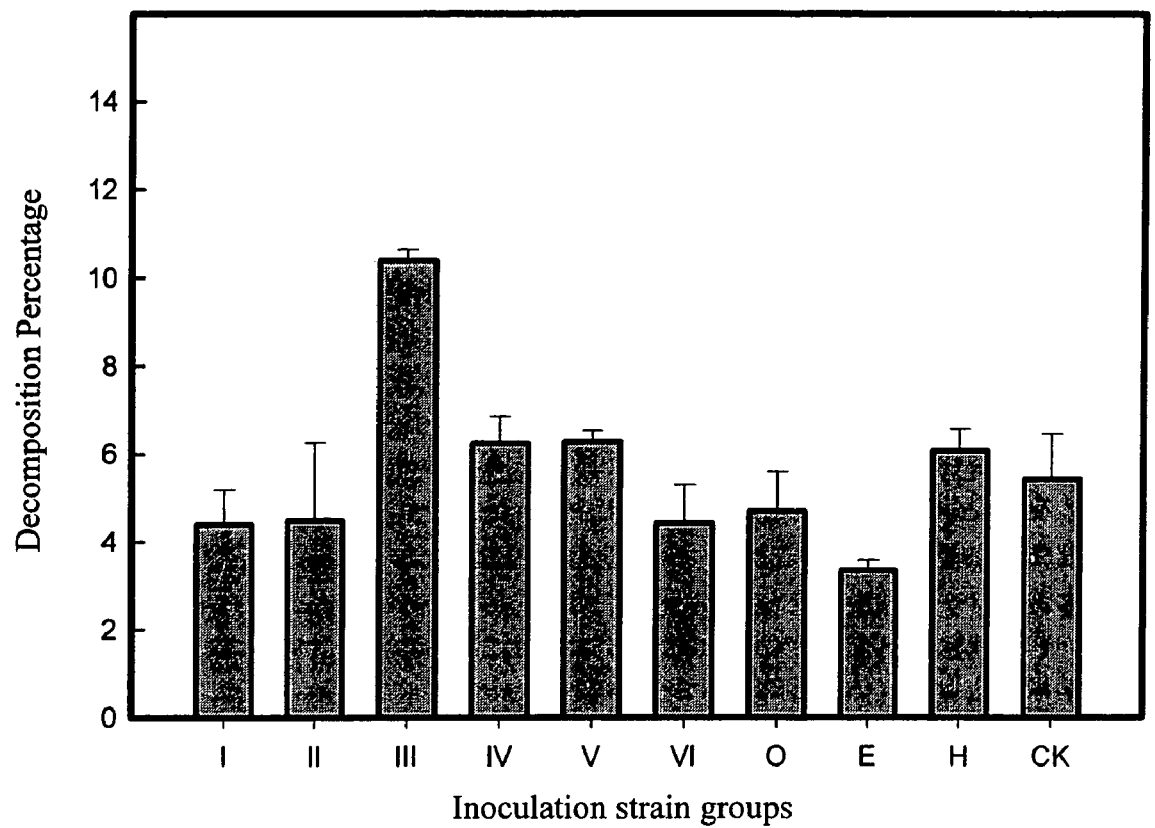
FIG. 1 shows the ability of various strains to decompose the rice straw of Japonica rice.

The present invention will now be described more specifically with reference to the following embodiments. The present invention relates to a fiber mulching mat and the production method thereof, and more particularly, to a fiber mulching mat of a non-woody fiber and the production method thereof. The detailed steps of the production method are described as follows.

1. The steps for producing a biopulp fiber:

(1) The rice straws are cut into small fragments having the length of 2-3 cm.

The waste rice straws of an Indica rice (*Oryza sativa* L. subsp. indica) and Japonica rice are provided. The variety of the Indica rice is Taichung Sheng No. 10 and that of the Japonica rice is Tai Keng No. 9. The rice straws are sun-dried, cut into small segments of 2-3 cm length.

(2) The selection of bacterial strains having decomposition ability:

The microorganism strains are obtained by the following method according to a preferred embodiment. First, 10 g of the rice straws and 10 g of livestock excrements are prepared and added into 90 ml of sterile water containing agar (0.1%, w/v). The materials are well mixed and a serious dilution is made. Then, 0.1 ml of $10^3 \times$ and $10^4 \times$ diluted solution are uniformly spread on Nutrient Agar plate, pH 8 (NA, purchased Nutrient Agar from Difco company) and Potato Dextrose Agar plate, pH 8 (PDA, purchased Potato Dextrose Agar from Difco company) respectively. Next, the plates are placed in the incubators under 30° C. and 50° C. for 24 hours and 48 hours respectively. Single colonies grown on plates are picked and isolated for obtaining the microorganism strains. The number of microorganisms isolated from the rice straws and the livestock excrements having the decomposition ability is more than 200 strains. Finally, the microorganisms are identified by the Gram stain. It is found that most of the microorganisms are Gram-positive bacteria.

The isolated microorganisms are further selected by the following steps for selecting the microorganism strains having the decomposition ability for rice straws. (a) 19 strains of the isolated strains, named PMBP-m1, PMBP-m2, PMBP-m3, PMBP-m4, PMBP-m5, PMBP-m6, PMBP-m7, PMBP-O1, PMBP-O2, PMBP-O3, PMBP-O4, PMBP-e1, PMBP-e2, PMBP-e3, PMBP-e4, PMBP-H1, PMBP-H2, PMBP-H3 and PMBP-H4 (as shown in Table 1), are divided into 9 strains groups, including PMBP-I, PMBP-II, PMBP-III, PMBP-IV, PMBP-V, PMBP-VI, PMBP-O, PMBP-E and PMBP-H. Please refer to Table 1, which shows the bacterial strains of different strain groups and the characteristics thereof. (b) The strains groups are cultured with NA plates respectively and then a suspension of microorganism is prepared at the concentration of $10^8$ cfu/ml. (c) 100 ml of solution containing rice straws of Japonica rice (5%, w/v) is prepared. (d) 1 ml of the microorganism suspension is added into the sterile solution prepared in step (c) and then cultured under 50° C. and 200 rpm shaking for a week. Each strain is set up in duplicate. (f) The decomposition percentage of rice straws is calculated.

(3) The LBY (Lactose Beef extract Yeast extract) culture media containing $10^6$ cfu/ml PMBPIII bacterium strains [including *Bacillus licheniformis* (PMBP-m5) (Patent Deposit Designation: PTA-5824, deposited on Feb. 18, 2004 with the American Type Culture Center, Manassas, Va. 20110-2209, USA), *B. subtilis* (PMBP-m6) (Patent Deposit Designation: PTA-5818, deposited on Feb. 13, 2004 with the American Type Culture Center, Manassas, Va. 20110-2209, USA), and *B. amyloloquefaciens* (PMBP-m7) (Patent Deposit Designation: PTA-5819, deposited on Feb. 13, 2004 with the American Type Culture Center, Manassas, Va. 20110-2209, USA), respectively] are provided. The formula of the LBY medium consists of 0.25% (w/v) lactose, 0.2% (w/v) beef extract and 0.05% (w/v) Yeast extract.

TABLE 1

| Isolate | Characteristics | | |
|---|---|---|---|
| | Temp. 50° C. | pH 8 | Gram stain (+/−) |
| PMBP-m1 | ++ | + | + |
| PMBP-m2 | ++ | + | + |
| PMBP-m3 | ++ | + | + |
| PMBP-m4 | ++ | + | + |
| PMBP-m5 | ++ | + | + |
| PMBP-m6 | ++ | + | + |
| PMBP-m7 | ++ | + | + |
| PMBP-O1 | ++ | + | + |
| PMBP-O2 | ++ | + | + |
| PMBP-O3 | ++ | + | + |
| PMBP-O4 | ++ | + | + |
| PMBP-e1 | ++ | + | + |
| PMBP-e2 | ++ | + | + |
| PMBP-e3 | ++ | + | + |
| PMBP-e4 | ++ | + | + |
| PMBP-H1 | ++ | + | + |
| PMBP-H2 | ++ | + | + |
| PMBP-H3 | ++ | + | + |
| PMBP-H4 | ++ | + | + |

Please refer to FIG. 1, which shows the ability of various strains to decompose the rice straw of Japonica Rice. The Japonica rice straws treated with shaking culturing for a week are classified, dried and weighted. The decomposition percentage of rice straws treated with different microorganisms is calculated by the following formula.

$$\text{Decomposition \%} = \frac{(\text{Total dry weight of fermentative rice straws} - \text{Dry weight of intact rice straws})}{(\text{Total dry weight of fermentative rice straws})} \times 100$$

As shown in FIG. 1, the PMBIII strain group has the best decomposition ability than the others. The decomposition percentage of rice straws is about 10.38%. The PMBIII consists of *Bacillus licheniformis* (PMBP-m5), *B. subtilis* (PMBP-m6) and *B. amyloloquefaciens* (PMBP-m7).

(4) The rice straws are added into the LBY medium containing $10^6$ cfu/ml PMBPIII bacterium strain at a concentration of 0.05% (w/v). All the materials described above are put into a flask.

(5) The flask is fermentatively cultured at 50° C. and shaken at 200 rpm for 4 days.

(6) After the fermentation culturing, oxide (CaO) is added into the fermentative culture solution and then the solution is boiled under 140° C. for 30 min for forming a biopulp solution.

(7) The biopulp solution is screened by sieves with 18, 200 and 270 meshes respectively for producing the biopulp fiber solution.

2. The production and utilization of the liquid fiber mulching mat of waste rice straws are described as follows.

(1) The production of the fiber pulp:

The alginic salt (a kind of polymer) is added into the biopulp fiber solution of waste rice straws at the concentration of 2500 ppm. Water is added into the biopulp fiber solution by the volume of five times of the biopulp. The biopulp fiber solution, the alginic salt and water are mixed well for forming a liquid fiber pulp. Other kinds of polymer can be used, for example, alginic acid and polyelectrolytes, etc. Also, the corn wheat bran or starch can be used to replace the polymer at a concentration ranged from 0.5-1.0% (w/v). Also, the quantity of water added into the biopulp fiber solution can be a volume of 2 to 10 times of the biopulp fiber solution.

(2) The utilization of the liquid fiber mulching mat of waste rice straws on the mountainside land for water and soil conservation.

Figure 2:
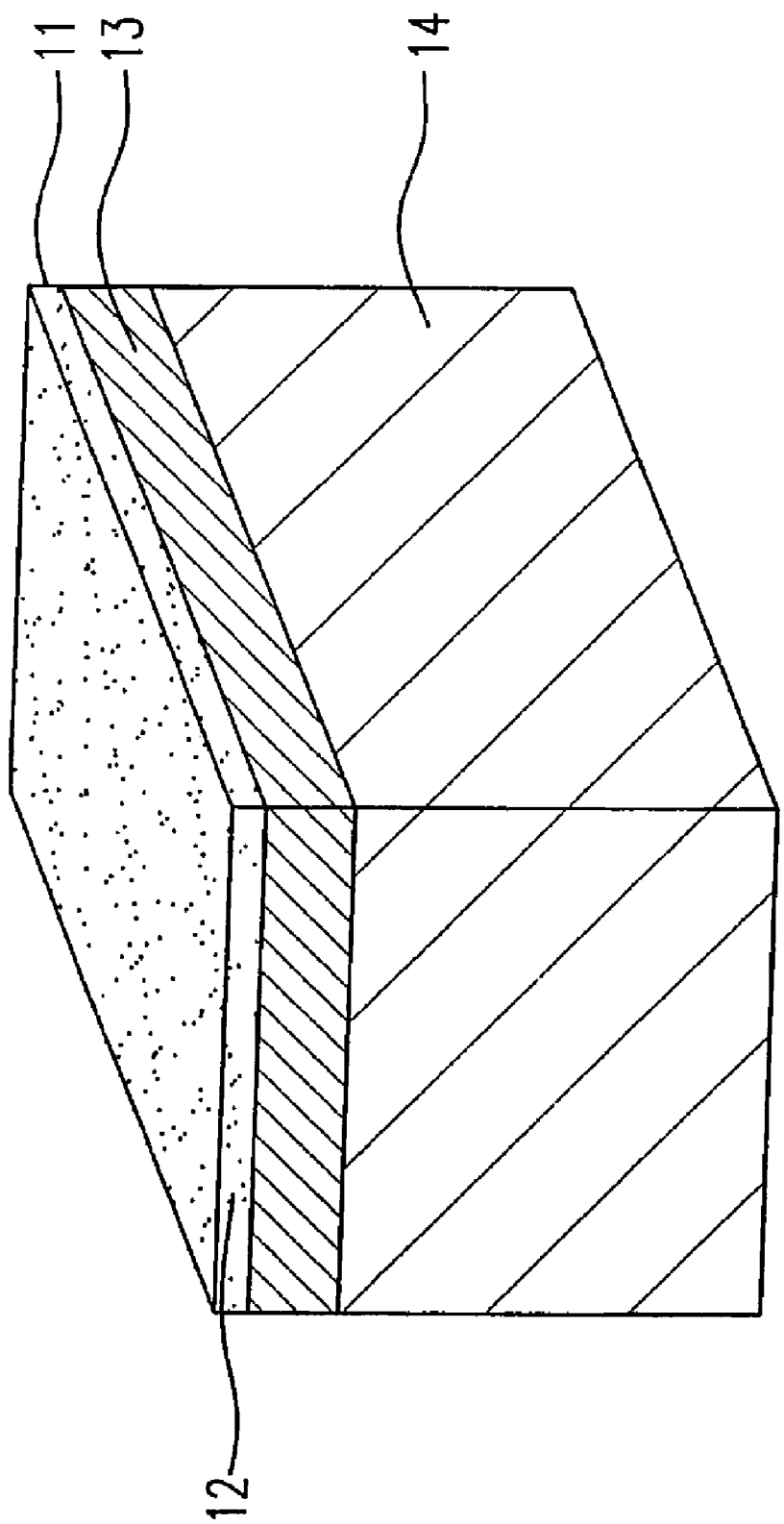
FIG. 2 is a profile of according to a preferred embodiment of the present invention.

The Para grass seeds for grass vegetation are added into the fiber pulp. The seeds for grass vegetation can be other species such as the Bahiagrass, the Pangola grass, Para grass, Bermuda grass, and Augustine grass, etc. The seeds are mixed with the liquid pulp well to form a well-mixed fiber pulp containing the seeds for grass vegetation. And then the mixed fiber pulp containing the seeds for grass vegetation is sprayed on the soil surface of the mountainside land. Please refer to FIG. 2, which is a soil profile according to the preferred embodiment of the present invention. The soil profile shown in FIG. 2 includes the liquid mulching mat 11, the topsoil 13 and the rock stratum 14, wherein the seeds 12 for grass vegetation are well distributed in the liquid mulching mat 11. One to two weeks later, the fiber mulching mat will be formed on the soil surface. If the fiber pulp containing the seeds for grass vegetation is used in mountainside land, the seeds will germinate after a period of time. This will be helpful to the maintenance of the trees and vegetative cover for preventing soil collapse. So, the water and soil conservation is achieved.

(3) The utilization of the liquid fiber mulching mat of waste rice straws in the arid area for preventing desertification and dust storm:

The starch powder is added into the biopulp fiber solution of waste rice straws at the concentration of 0.6% (w/v) according to a preferred embodiment of the present invention. Water is added into the biopulp fiber solution by the volume of ten times of the biopulp fiber solution. The biopulp fiber solution, the alginic salt and water are mixed well for forming a fiber pulp. And then the mixed substrate of the liquid fiber mulching mat containing the seeds for grass vegetation is directly applied on the soil surface of a desert or an arid area to form a liquid fiber mulching mat. One or two weeks later, the liquid fiber mulching mat will dry and the fiber mulching mat will be formed on the soil surface. By means of the fiber mulching mat, it can decrease the water evaporation and prevent desertification and dust storm.

(4) The utilization of the liquid fiber mulching mat of waste rice straws in the agricultural cultivation for preventing weeds:

According to a preferred embodiment of the present invention, the corn bran is added into the biopulp fiber solution at a concentration of 0.7% (w/v). The water is added into the biopulp fiber solution by a volume of 10 times of the biopulp fiber solution and then the materials are mixed well. The mixed fiber pulp is sprayed uniformly on the soil surface of a farm. After one to two weeks the fiber mulching mat is formed on the soil surface. The weed seeds in the soil do not germinate because the sunlight is isolated from the soil by the fiber mulching mat. Therefore, the weed control is achieved. The fiber mulching mat having the property of air-permeability will not result in poor water-permeability and air-permeability or influence the ecological environment of soil microorganisms, root system of cultivated seedling, and the growth of crops. The fiber mulching mat is excellent carriers for microorganisms. After achieving the purpose of agricultural producing, the fiber mulching mat has the advantage of being decomposable in natural environment easily to be the organic matters of the soil and does not result in pollution.

In the extensive-cultivation area, the crop seeds are widely seeded. The crop seeds can be mixed with the fiber pulp. And then the fiber pulp containing crop seeds is applied on the farm surface. Therefore, the seeding and the weed prevention are accomplished at the same time. This not only mitigates the painstaking of the farmer but also increases the work efficiency. Nowadays, the production costs of agriculture increase with time. The present invention provides a way to decrease the production costs.

The liquid fiber mulching mat of waste rice straws can be applied to the large area field, the farm site, the home garden, the golf course, the three-dimensional cultivating box containing organic soil and medium, the indoor planting system with light-control and temperature-control apparatus, and the organic farming for planting various crops according to a preferred embodiment. The liquid fiber mulching mat is directly sprayed on the soil surface after a polymer being added into the biopulp fiber solution. The work of spraying the liquid fiber mulching mat on a large field can be proceeded by using a motorized sprayer. This is not only rapid but also convenient to apply the fiber pulp in a large area. If the fiber pulp is applied in a small area, such as a small farm and garden, a spraying apparatus for spraying insecticide or a household sprayer can be used to spray the liquid fiber pulp on the soil surface for forming the liquid fiber mulching mat. Thus, the liquid fiber mulching mat of waste straws of the present invention is a convenient and effective invention.

(5) The production and utilization of the solid fiber mulching mat of waste rice straws in the agricultural cultivation for preventing weeds:

The biopulp fiber solution of waste rice straws can be used to produce a solid fiber mulching mat by a paper producing process. The steps of producing a solid fiber mulching mat are described as follows. First, the biopulp fiber solution of waste rice straws is spread to form a thin layer. Second, the spread thin-layer fiber pulp is extruded and dehydrated. Third, a drying process is proceeded for forming the solid mulching mat. The solid fiber mulching mat of waste rice straws can be rolled up, and cut into a specific shape in use. The solid fiber mulching mats of waste rice straws can be used in a rice paddy. After soil preparation of the paddy field, the steps are as follows. (1) The solid fiber mulching mat of waste rice straws is cut into a square of 1.5 m×1.5 m. (2) The solid fiber mulching mat of waste rice straws is cut by razor blade to form cultivation holes. (3) The solid fiber mulching mat of waste rice straws is evenly paved on the soil and the rice seedlings are transplanted in the cultivation holes. The paving of the paper mat can be performed manually or by machine, but it is to be noted that the field water should be lessened as little as possible to render the junction between the soil and solid fiber mulching mat of waste rice straws hermetic so as to prevent the formation of gaps and thus the solid fiber mulching mat of waste rice straws will not be easily turned up or worn out. As using the solid fiber mulching mat of waste rice straws, it should be noted that the surface of soil have to be kept even in order to avoid forming a hollow beneath the solid fiber mulching mat of waste rice straws or forming bubbles, which might ruin the solid fiber mulching mat of waste rice straws. It is easy to achieve the prevention of weeds while transplanting the seedlings in the cultivation holes having proper planting distance therebetween. Using a solid fiber mulching mat of waste rice straws in a paddy field can isolate the surface of the soil from being exposed directly under the sunshine, thereby the growth of weed germinating is restrained and the purpose of weed prevention is achieved. Because the solid fiber mulching mat of waste rice straws is easy to be naturally decomposed in natural environment, the mat is completely decomposed into tiny fiber to be mixed with the soil and no more paper pieces are suspended in the field while harvesting. Moreover, the following agricultural activity will not be affected and the secondary pollution will not occur.

As described above, the purposes of the present invention can be generalized as follows: (1) In agricultural cultivation, the fiber mulching mat can be used to prevent the weeds. (2) In mountainside land, the fiber mulching mat can be used to aid the maintenance of the trees and vegetative cover for preventing soil collapse. (3) In arid area, the fiber mulching mat can be used to decrease water evaporation and prevent desertification and dust storm.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A production method of forming a solid fiber mulching mat from a non-woody fiber plant, comprising the steps of:
    (a) fermenting said non-woody fiber plant by adding a suspension of a microorganism that is one selected from a group consisting of a *Bacillus licheniformis* having been deposited under ATCC Accession No: PTA-5824, a *Bacillus subtilis* having been deposited under ATCC Accession No: PTA-5818, and a *Bacillus amyloliquefaciens* having been deposited under ATCC Accession No: PTA-58 19;
    (b) boiling said fermented non-woody fiber plant with a calcium oxide for generating a biopulp;
    (c) mixing said biopulp, with a polymer and a water for preparing a fiber pulp of said non-woody fiber plant;
    (d) spreading said fiber pulp of said non-woody fiber plant;
    (e) squeezing and dehydrating said fiber pulp; and
    (f) drying said fiber pulp so as to form said solid fiber mulching mat.

2. The production method as claimed in claim 1, wherein said polymer is added into said biopulp at a concentration of 2500 ppm.

3. The production method as claimed in claim 2, wherein said polymer is one selected from a group consisting of an alginic acid, an alginic salt, a polyelectrolyte, a corn bran and a starch.

4. The production method as claimed in claim 3, wherein said corn bran has a concentration ranged from 0.5 to 1.0% (w/v).

* * * * *